United States Patent
Trimble et al.

(10) Patent No.: US 7,610,937 B1
(45) Date of Patent: Nov. 3, 2009

(54) SELF-SEALING REGULATOR FILL PORT PROTECTIVE/DUST COVER

(75) Inventors: Ray Trimble, Woodstock, IL (US); Jeff Schreiber, Grayslake, IL (US)

(73) Assignee: Pressure Specialist Inc., Crystal Lake, IL (US)

( * ) Notice: Subject to any disclaimer, the term of this patent is extended or adjusted under 35 U.S.C. 154(b) by 0 days.

(21) Appl. No.: 12/146,735

(22) Filed: Jun. 26, 2008

(51) Int. Cl.
*F16L 55/10* (2006.01)
(52) U.S. Cl. .................... 138/89.4; 138/89; 220/230
(58) Field of Classification Search ....... 138/89.1–89.4, 138/96 R, 89; 220/230
See application file for complete search history.

(56) References Cited

U.S. PATENT DOCUMENTS

| | | | | |
|---|---|---|---|---|
| 2,438,231 A | * | 3/1948 | Schultz et. al. | 401/244 |
| 2,717,096 A | * | 9/1955 | Henderson | 220/301 |
| 3,602,250 A | * | 8/1971 | Neenan | 137/386 |
| 3,961,721 A | * | 6/1976 | Gordon et al. | 220/230 |
| 4,168,129 A | * | 9/1979 | Herrnring | 401/243 |

* cited by examiner

*Primary Examiner*—Patrick F Brinson
(74) *Attorney, Agent, or Firm*—Levenfeld Pearlstein, LLC

(57) ABSTRACT

A self-sealing protective/dust cover for application to a magnetically attractable filling port includes a sleeve defined by a closed wall and closed at one end by an end face. The closed wall defines an open central region and the end face is contiguous with the closed wall. A magnet provide magnetic attraction between the protective/dust cover and the filling port to maintain the protective/dust cover on the filling port.

8 Claims, 2 Drawing Sheets pattern# SELF-SEALING REGULATOR FILL PORT PROTECTIVE/DUST COVER

BACKGROUND OF THE INVENTION

The present invention is directed to a protective cover for a fill port. More particularly, the present invention is directed to a self-adhering protective cover for a fill port for a pressurized gas regulator.

Pressure regulators are commonly known devices that are often present between a pressurized gas source and a device that uses the pressurized gas. Typically, the regulators regulate the flow of gas from the source to the target device in order to maintain the pressure of the target device at a desired level.

In one industry in which pressure regulators are prevalent, the paint ball industry, pressure regulators are used between a compressed gas bottle and the trigger mechanism of the paint ball gun. The pressure regulator is configured to reduce the pressure from the bottle to a desired, preset pressure at the gun trigger. Such regulators can take down or reduce the pressure from as high as 7500 psi to 1500 psi or less.

Typically, the bottles that are used for paint ball and used in connection with paint ball guns are relatively small, portable bottles that can be either mounted to the guns or carried by a user, for example, in a harness on a user's back. In that paintball gun technology has advanced to the point where thousands of rounds of paintballs can be fired per minute, the amount of compressed gas that is used in a single outing or tournament can be quite substantial.

In order to eliminate the need to remove the connections between the bottle and the gun in order to refill a bottle, a fill port is often located on the regulator to permit refilling the bottle directly while the bottle remains fully connected to the gun. Such a fill port typically is a threaded connection that includes a check valve in the form of a stem and head located within the fill port. In filling the bottle, a temporary fill connection is made directly to the fill port on the regulator and pressurized gas is fed from a source directly into the bottle. Once the bottle is filled, the temporary source is disconnected from the fill port on the regulator, the check valve seals the fill port, and play can resume.

In order to prevent contamination of the regulator and/or compressed gas in the bottle, dust/contamination covers are used to cover the fill port. Known fill port protective covers are simply rubber nipples that are friction fitted over the end of the port to prevent contamination. While these covers serve their functions well, they are often knocked from the fill port or dislodged during use. In that a typical paintball gun may be subject to rigorous motion during use, it has been observed that these protective covers frequently dislodge and fall from the fill ports. This, of course, provides an ingress path for contamination into the regulators and perhaps into the compressed gas within the bottle.

Accordingly, there is a need for a self-sealing contamination/protective cover for regulator fill ports. Desirably, such a cover is inexpensive and is readily installed on and removed from the fill port. Most desirably, such protective cover remains affixed to the fill port and, when removed, leaves no residue on the fill port, such as adhesive residues.

BRIEF SUMMARY OF THE INVENTION

A self-sealing protective/dust cover is adapted for application to a magnetically attractable filling port. The cover includes a sleeve defined by a closed wall and is closed at one end by an end face. The closed wall defines an open central region (cup-shaped) and the end face is contiguous with the closed wall.

Magnetic attraction between the protective/dust cover and the filling port self-seals the protective/dust cover to the filling port, to maintain the protective/dust cover on the filling port. Magnetic means can be provided, for example, by a magnet disposed in the open central region adjacent the end face.

In a present cover the sleeve has a circular cross-section. The magnet can be a metal magnet, a ceramic magnet or formed from any other magnetic material. The magnet is adhered to the end face and can be adhered by an adhesive.

In a present embodiment, the sleeve is formed as a unitary element. Preferably, the magnet is substantially coextensive with the end face.

These and other features and advantages of the present invention will be apparent from the following detailed description, in conjunction with the appended claims.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein.

DETAILED DESCRIPTION OF THE INVENTION

Figure 1:
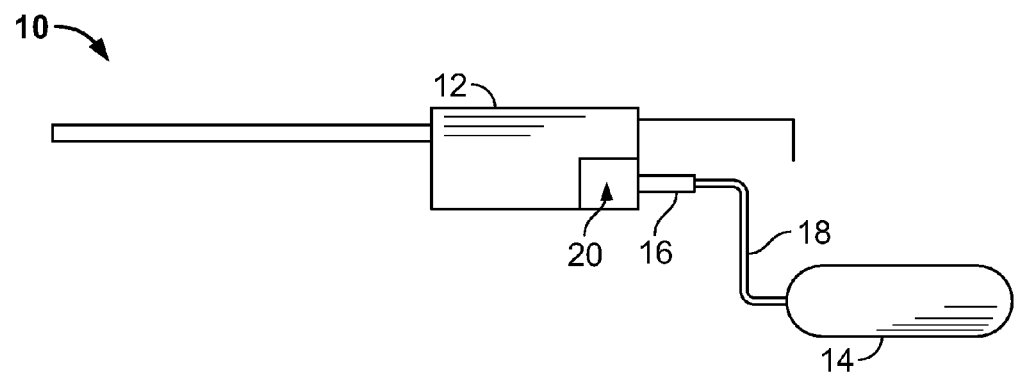
FIG. 1 is a schematic diagram of a conventional paint ball gun system showing a paintball gun, a compressed gas bottle and a pressure regulator therebetween.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

It should be further understood that the title of this section of this specification, namely, "Detailed Description Of The Invention", relates to a requirement of the United States Patent Office, and does not imply, nor should be inferred to limit the subject matter disclosed herein.

Referring now to the figures and specifically to FIG. 1, there is shown a conventional paint ball system 10 including a paint ball gun 12, a compressed gas bottle 14 and a pressure regulator 16. The regulator 16 is mounted between the gun 12 and the bottle 14, typically at the gun 12, although it is not unknown for the regulator to be mounted at the bottle. High pressure hoses 18 extend between the bottle 14 and the trigger mechanism 20 (and include the regulator 16) in order to provide flow communication from the bottle 14 to the trigger 20.

Figure 2:
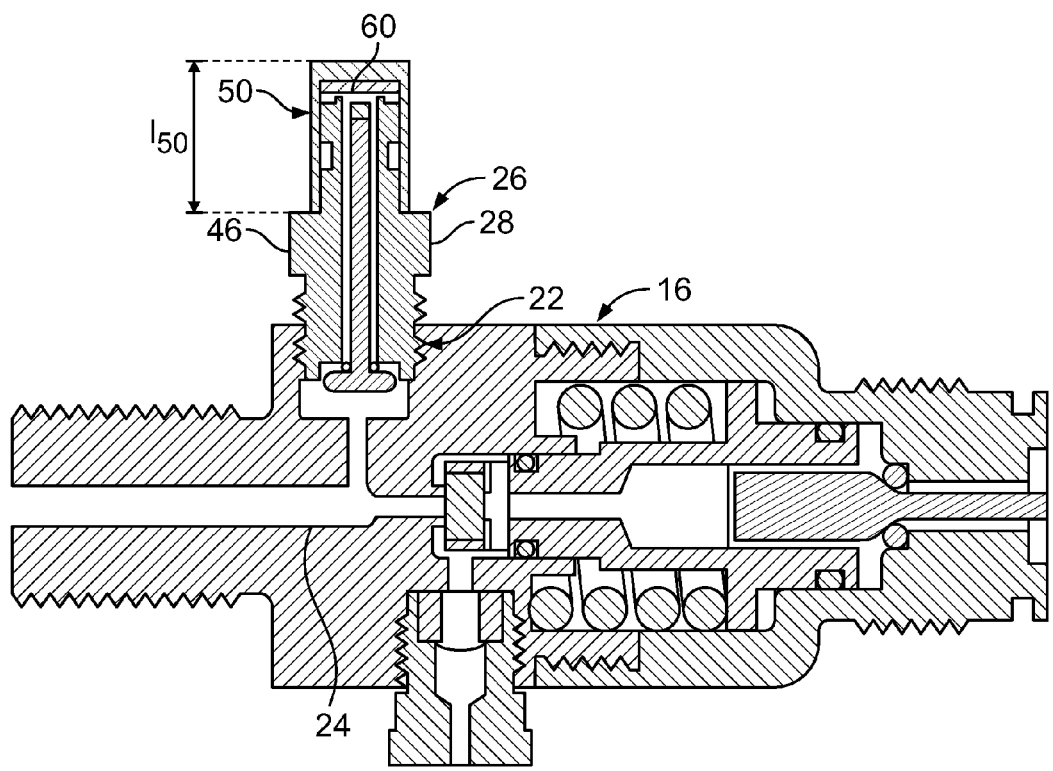
FIG. 2 is a cross-sectional illustration of a known pressurized gas regulator used in the paintball gun system, and showing a fill port with a self-sealing protective/dust cover thereon embodying the principles of the present invention.

One known regulator is illustrated in FIG. 2. This regulator 16, which is a preset regulator, is more fully disclosed and described in Carroll, U.S. Pat. No. 6,851,447. commonly assigned with the present application and incorporated herein by reference.

A port 22 in the regulator 16, on the high pressure side 24 of the regulator 16, is threaded and accommodates the fill port 26. The fill port 26 allows for directly filling the bottle 14 from a high pressure source (not shown) while the regulator 16 is or remains connected into the paintball gun system 10. Typically, the port 26 includes a body 28 and an inlet port region 30. A check valve 32, typically in the form of a reciprocating element 34 having a head 36, a stem 38 and a seal 40, is positioned within the fill port body 28 such that the stem 38 extends up through the inlet port region 30 and the seal 40 resides at and forms a seal at the port body 28. The inlet port body 28 can include channels 42 or recesses in the outer surface 44 thereof in order to, for example, accommodate a positive (temporary) lock for a high pressure hose during filling of the bottle 14.

As will be appreciated from the figures, the fill port 26 provides an ingress path for not only high pressure gas, but also, potentially, contaminants and undesired materials to enter into the pressurized gas system. In order to prevent the ingress of contamination, protective covers are known.

Figure 3:
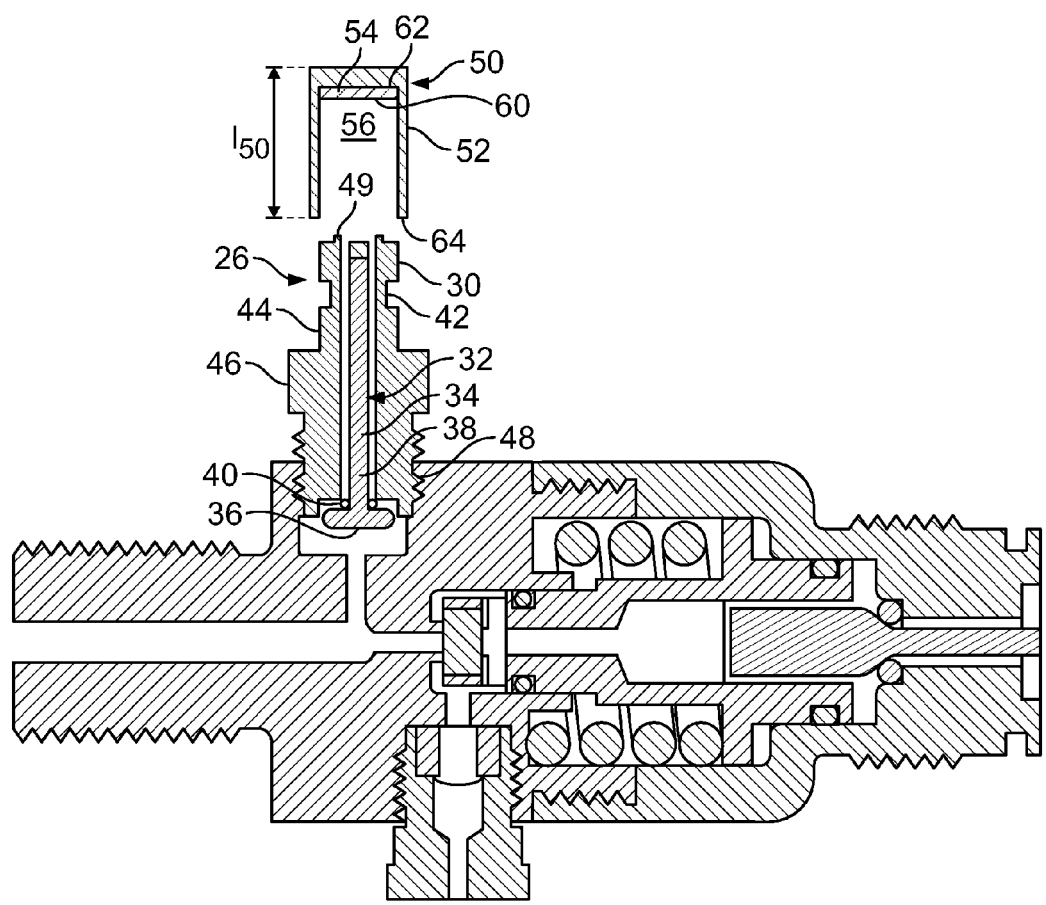
FIG. 3 is a cross-sectional illustration similar to FIG. 2 with the protective/dust cover removed from the fill port.
Figure 4:
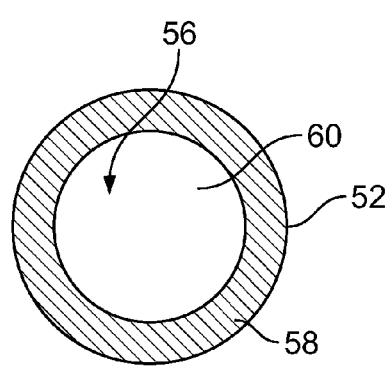
FIG. 4 is a bottom view (relative to FIG. 3), of the protective/dust cover illustrating the inside of the cover.
Figure 5:
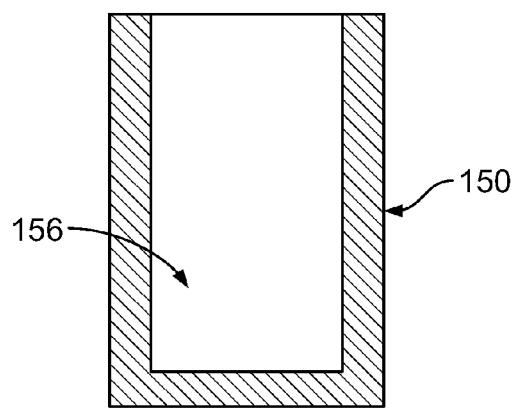
FIG. 5 is a cross-sectional view of an alternate embodiment of the protective/dust cover.

A present protective cover 50, illustrated in FIGS. 2-4 provides a novel, self-sealing or self-adhering member for protecting the fill port 26 and preventing the ingress of contamination. The present cover 50 includes a sleeve 52 integral with an end face 54 (essentially defining a cup shaped well 56) that fits over the port 26 to seal the port 26. In a present embodiment the sleeve 52 (which is defined by a closed wall 58, i.e., a closed periphery when viewed from an open end view, as in FIG. 4), is formed as a unitary element. That is, the closed wall 58 and end face 54 are fully contiguous.

The protective cover 50 includes magnetic means to maintain a magnetic attraction between the cover 50 and the fill port 26. In one embodiment, a magnet 60 is disposed at the end face 54 of the cover 50 in the well 56. In an embodiment, the magnet 60 is adhered to the end face 54 by an adhesive 62 or the like. The magnet 60 can be a metallic magnet, ceramic magnet, or any other magnetic member that will provide an attractive force between the cover 50 and the fill port 26. Preferably, the magnet 60 is substantially coextensive with the end face 54.

Preferably, as seen in FIG. 2, the sleeve 52 fits over the outer body 28 of the fill port 26 with little space between the body 28 and the cover 50. A present fill port 26 includes a large, hexagonal section 46 between the threads 48 and the fill port body 28 and, in a preferred embodiment of the present cover 50, a free end 64 of the cover 50 approaches or contacts the hexagonal region 46 when the cover 50 is fully applied over the port 26. Most preferably, the length $l_{50}$ of the cover 50 is configured such that the magnet 60 contacts an end 49 of the fill port 26 at the same time that the free end 64 of the cover 50 abuts the hexagonal region 46 of the fill port 26 (as seen in FIG. 2).

It will also be appreciated that if the fill port (check) valve 32 is formed from steel or a like magnetically attractable material, the magnet 60 in the cover 50 will attract the stem 38 to help maintain the valve 32 in the closed state.

In the present embodiment, the sleeve 52 is circular (that is an open round cylinder), however, it will be appreciated that many shapes such as octagonal cylinders, square cylinders and the like can be used to provide the novel cover features.

It will also be appreciated that the cover 50 can be formed from a variety of materials. The present cover is formed from a non-corroding metallic material, such as machined aluminum or the like. It will, however, be appreciated that other metals, such as steel or brass as well as nonmetals, such as plastics and the like, can be used. In an embodiment, the cover 150 is formed from steel and is magnetized to provide the magnetic attraction between the cover 150 and the fill portion 26, without the need for a separate magnet in the cover well 156.

Preferably, the magnet 60 is maintained in the cover by an adhesive 62, however, other means to maintain the magnet 60 affixed to the inside of the cover 50 will be recognized by those skilled in the art. Such means can include welding, press fitting or the like.

While the present cover 50 has been described in reference to use in connection with a fill port 26 for compressed gas regulators 16 for use in paintball systems 10, it will be recognized by those skilled in the art and appreciated that the present cover 50 can be used in a wide variety of applications, for example, for pressurized tire filling stems, and that the above disclosure should not be construed as limiting with respect to the applications for the present cover 50.

All patents referred to herein, are hereby incorporated herein by reference, whether or not specifically done so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred.

What is claimed is:

1. A self-sealing protective/dust cover for application to a magnetically attractable filling port, comprising:
   a sleeve defined by a closed wall and closed at one end by an end face, the closed wall defining an open central region, the end face contiguous with the closed wall; and
   magnet means for magnetically attracting the protective/dust cover to the magnetically attractable filling port,
   wherein when the protective/dust cover is applied to the filling port, the magnetic attraction between the protective/dust cover and the filling port maintains the protective/dust cover on the filling port, and wherein the magnet means is a flat magnet disposed in the open central region adjacent and adhered to the end face, sufficient to maintain the protective/dust cover attracted to the fill port.

2. The protective/dust cover in accordance with claim 1 wherein the sleeve has a circular cross-section.

3. The protective/dust cover in accordance with claim 1 wherein the magnet is a metal magnet.

4. The protective/dust cover in accordance with claim 1 wherein the magnet is a ceramic magnet.

5. The protective/dust cover in accordance with claim 1 wherein the magnet is adhered to the end face by an adhesive.

6. The protective/dust cover in accordance with claim 1 wherein the sleeve is formed as a unitary element.

7. The protective/dust cover in accordance with claim 1 wherein the magnet is substantially coextensive with the end face.

8. The protective/dust cover in accordance with claim 1 wherein the protective/dust cover is magnetic.

\* \* \* \* \*